United States Patent
Hopcraft et al.

(10) Patent No.: US 9,813,317 B2
(45) Date of Patent: Nov. 7, 2017

(54) SELF-LOCALIZING DATA DISTRIBUTION NETWORK

(71) Applicant: Tektronix Texas, LLC, Westford, MA (US)

(72) Inventors: Geoff Hopcraft, Piedmont, CA (US); Alex McEachern, Pinole, CA (US)

(73) Assignee: Tektronix Texas, LLC, Westford, MA (US)

( * ) Notice: Subject to any disclaimer, the term of this patent is extended or adjusted under 35 U.S.C. 154(b) by 179 days.

(21) Appl. No.: 14/791,116

(22) Filed: Jul. 2, 2015

(65) Prior Publication Data

US 2017/0005889 A1 Jan. 5, 2017

(51) Int. Cl.
*H04L 12/26* (2006.01)
*H04L 29/08* (2006.01)
*G06F 15/16* (2006.01)

(52) U.S. Cl.
CPC .............. *H04L 43/08* (2013.01); *H04L 67/10* (2013.01)

(58) Field of Classification Search
CPC ................................ H04L 43/08; H04L 67/10
USPC ........ 709/223, 224, 226, 227; 707/755, 758, 707/792
See application file for complete search history.

(56) References Cited

U.S. PATENT DOCUMENTS

| | | | | |
|---|---|---|---|---|
| 6,119,229 A * | 9/2000 | Martinez | ............... | A63F 13/12 726/28 |
| 7,831,744 B2 * | 11/2010 | Hiramatsu | ............ | G06F 3/0611 710/20 |
| 2012/0259849 A1 * | 10/2012 | Deodhar | ............. | G06F 21/6218 707/737 |
| 2015/0324336 A1 * | 11/2015 | Glezos | ................ | G06F 17/2247 715/234 |

OTHER PUBLICATIONS

"Business Without Borders: The Importance of Cross-Border Data Transfers to Global Prosperity"—Hunton & Williams LLP, U.S. Chamber of Commerce, May 2014 https://www.huntonprivacyblog.com/wp-content/uploads/sites/18/2014/05/021384_BusinessWOBorders_final.pdf.*

* cited by examiner

*Primary Examiner* — Randy Scott

(57) ABSTRACT

To adaptively self-localize distributed data processing and data distribution and reduce data transfer costs in a network monitoring system, data has a corresponding ownership association. For each data access, an ownership association value for the accessed data may be modified based on whether the access originated with a current owner processing node or a second most-frequently accessing processing node. The ownership association value indicates a strength of the ownership association between the data and the owner and is based on at least a recent history of accesses of the data by the current owner and the second most-frequently accessing node. When the ownership association value traverses a selected cutoff, ownership association of the data is transferred from the current owner to the second most-frequently accessing node. The ownership association transfer contributes to self-localizing data processing based on a source of input regarding the data.

20 Claims, 11 Drawing Sheets

SELF-LOCALIZING DATA DISTRIBUTION NETWORK

TECHNICAL FIELD

The present disclosure relates generally to distributed data processing and data distribution in network monitoring systems, and more specifically to addressing backhaul data transfer issues that may arise in such distributed data processing and data distribution systems.

BACKGROUND

Distributed computing and distributed database environments provide a structure for handling the challenges of "big data," large volumes of data that require processing, usually in short periods. While allowing increased computational and storage resources to be applied to a big-data problem and enabling redundancies to minimize downtime of key capabilities, this distribution of processing and/or storage comes at a cost—the transfer of data between systems requires computational and backhaul (network) resources. As a result, a large-scale distributed design may be limited by distribution costs.

SUMMARY

To adaptively self-localize distributed data processing and data distribution and reduce data transfer costs in a network monitoring system, data has a corresponding ownership association. For each data access, an ownership association value for the accessed data may be modified based on whether the access originated with a current owner processing node or a second most-frequently accessing processing node. The ownership association value indicates a strength of the ownership association between the data and the owner and is based on at least a recent history of accesses of the data by the current owner and the second most-frequently accessing node. When the ownership association value traverses a selected cutoff, ownership association of the data is transferred from the current owner to the second most-frequently accessing node. The ownership association transfer contributes to self-localizing data processing based on a source of input regarding the data.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description, taken in conjunction with the accompanying drawings, in which like reference numerals represent like parts.

DETAILED DESCRIPTION

Figure 1:
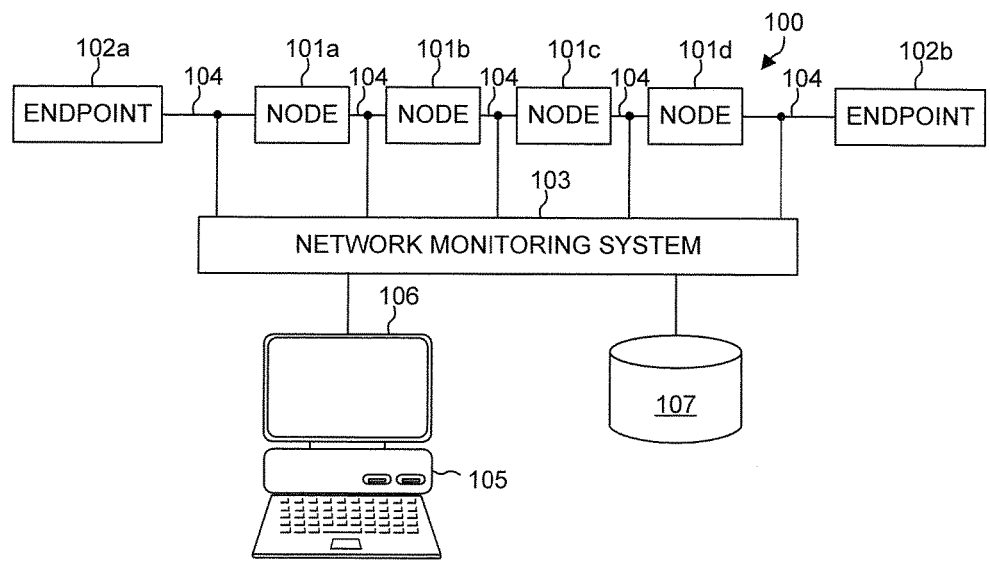
FIG. 1 is a high level diagram of a network monitoring environment within which self-localizing distributed processing and data distribution may be performed according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Distributed processing systems typically include input sources, processing nodes, and consumers. For many large-scale distributed systems, the input sources and consumers are themselves distributed. For example, in a $3^{rd}$ Generation (3G) telecommunications network monitoring system, the primary input sources are often radio network controllers, which are physically distributed in different cities around the nation, while the consumers for that information range from marketing executives interested in nationwide trends to technicians primarily interested in troubleshooting data for a specific city or group of cities.

Several approaches may be employed to handle use cases with distributed input sources and consumers. In one approach, localized input is processed locally, stored locally, and accessed locally. This approach minimizes backhaul requirements and is architecturally simple, but fails to achieve all of the advantages of distributed computing (redundancy, processing scalability, and nationwide data visibility).

In order to achieve the advantages of distributed computing, data and processing requests may be distributed to other nodes, either immediately or as part of some intermediate processing step, so that other nodes take part of the computational or storage load. Options for distribution methods include:

Arbitrary: a datum or processing job can go to any of a collection of processing or storage nodes;

Load-balanced: a datum or processing job goes to the processing or storage node which has the most available capacity; and Grouped: a datum or processing job goes to a processing or storage node according to some feature of the data, such as the item identifier. This option has the advantage that individual processing or storage nodes will be assigned all data associated with that feature, and therefore can do more advanced correlations across different data with that feature.

While these methods have different advantages and disadvantages, all share the disadvantage that most data are transmitted to a different node, even when the local node has available processing capacity.

The self-localizing data distribution network described herein preferentially takes advantage of local processing capability in order to achieve distributed capability while minimizing backhaul. Thus, data for an item that is originating from a particular source node will tend to be processed close to that source node. However, the system operates in a way that is adaptive to changes in the characteristics of input data and requests—if item data starts coming from a different source node, then the system will adapt to move the processing for that item in order to reduce overall backhaul.

Within the description below, "input" refers to input events, data, processing requests, or queries that will read or modify the system state. A "record" is an element of current state, typically modified by processing operations and input data. A "node" is a server or data processing system (or similar) that can typically perform operations on a record (such as reading, modifying, and storing the record). A "source" is an entry point for input, typically collocated with a subset of the nodes in the system.

FIG. 1 is a high level diagram of a network monitoring environment within which distributed processing and self-localizing data distribution may be performed according to embodiments of the present disclosure. Telecommunications network 100 includes network nodes 101a, 101b, 101c and 101d and endpoints 102a and 102b. For example, network 100 may include a wireless broadband network, a $3^{rd}$ Generation (3G) wireless network, a $4^{th}$ Generation (4G) wireless network, a $3^{rd}$ Generation Partnership Project (3GPP) Long Term Evolution (LTE) wireless network, a Voice-over-Internet Protocol (VoIP) network, an IP Multimedia Subsystem (IMS) network, etc. Although only four nodes 101a-101d and two endpoints 102a and 102b are shown in FIG. 1, it will be understood that network 100 may comprise any number of nodes and endpoints. Moreover, it will be understood that the nodes and endpoints in network 100 may be interconnected in any suitable manner, including being coupled to one or more other nodes and/or endpoints.

In some implementations, endpoints 102a and 102b may represent, for example, computers, mobile devices, user equipment (UE), client applications, server applications, or the like. Meanwhile, nodes 101a-101d may be components in an intranet, Internet, or public data network, such as a router, gateway, base station or access point. Nodes 101a-101b may also be components in a 3G or 4G wireless network, such as: a Serving GPRS Support Node (SGSN), Gateway GPRS Support Node (GGSN) or Border Gateway in a General Packet Radio Service (GPRS) network; a Packet Data Serving Node (PDSN) in a CDMA2000 network; a Mobile Management Entity (MME) in a Long Term Evolution/Service Architecture Evolution (LTE/SAE) network; or any other core network node or router that transfers data packets or messages between endpoints 102a and 102b. Examples of these, and other elements, are discussed in more detail below with respect to FIG. 4.

Still referring to FIG. 1, many packets traverse links 104 and nodes 101a-101b as data is exchanged between endpoints 102a and 102b. These packets may represent many different sessions and protocols. For example, if endpoint 102a is used for a voice or video call, then that endpoint 102a may exchange VoIP or Session Initiation Protocol (SIP) data packets with a SIP/VoIP server (i.e., the other endpoint 102b) using Real-time Transport Protocol (RTP). Alternatively, if endpoint 102a is used to send or retrieve email, the device forming endpoint 102a may exchange Internet Message Access Protocol (IMAP), Post Office Protocol 3 (POP3), or Simple Mail Transfer Protocol (SMTP) messages with an email server (i.e., the other endpoint 102b). In another alternative, if endpoint 102a is used to download or stream video, the device forming endpoint 102a may use Real Time Streaming Protocol (RTSP) or Real Time Messaging Protocol (RTMP) to establish and control media sessions with an audio, video or data server (i.e., the other endpoint 102b). In yet another alternative, the user at endpoint 102a may access a number of websites using Hypertext Transfer Protocol (HTTP) to exchange data packets with a web server (i.e., the other endpoint 102b). In some cases, communications may be had using the GPRS Tunneling Protocol (GTP). It will be understood that packets exchanged between the devices or systems forming endpoints 102a and 102b may conform to numerous other protocols now known or later developed.

Network monitoring system 103 may be used to monitor the performance of network 100. Particularly, monitoring system 103 captures duplicates of packets that are transported across links 104 or similar interfaces between nodes 101a-101d, endpoints 102a-102b, and/or any other network links or connections (not shown). In some embodiments, packet capture devices may be non-intrusively coupled to network links 104 to capture substantially all of the packets transmitted across the links. Although only five links 104 are shown in FIG. 1, it will be understood that in an actual network there may be dozens or hundreds of physical, logical or virtual connections and links between network nodes. In some cases, network monitoring system 103 may be coupled to all or a high percentage of these links. In other embodiments, monitoring system 103 may be coupled only to a portion of network 100, such as only to links associated with a particular carrier or service provider. The packet capture devices may be part of network monitoring system 103, such as a line interface card, or may be separate components that are remotely coupled to network monitoring system 103 from different locations. Alternatively, packet capture functionality for network monitoring system 103 may be implemented as software processing modules executing within the processing systems of nodes 101a-101d.

Monitoring system 103 may include one or more processors running one or more software applications that collect, correlate and/or analyze media and signaling data packets from network 100. Monitoring system 103 may incorporate protocol analyzer, session analyzer, and/or traffic analyzer functionality that provides OSI (Open Systems Interconnection) Layer 2 to Layer 7 troubleshooting by characterizing IP traffic by links, nodes, applications and servers on network 100. In some embodiments, these operations may be provided, for example, by the IRIS toolset available from TEKTRONIX, INC., although other suitable tools may exist or be later developed. The packet capture devices coupling network monitoring system 103 to links 104 may be high-speed, high-density 10 Gigabit Ethernet (10 GE) probes that are optimized to handle high bandwidth IP traffic, such as the GEOPROBE G10 product, also available from TEKTRONIX, INC., although other suitable tools may exist or be later developed. A service provider or network operator may access data from monitoring system 103 via user interface station 105 having a display or graphical user interface 106, such as the IRISVIEW configurable software framework that provides a single, integrated platform for several applications, including feeds to customer experience management systems and operation support system (OSS) and business support system (BSS) applications, which is also available from TEKTRONIX, INC., although other suitable tools may exist or be later developed.

Monitoring system 103 may further comprise internal or external memory 107 for storing captured data packets, user session data, and configuration information. Monitoring system 103 may capture and correlate the packets associated with specific data sessions on links 104. In some embodiments, related packets can be correlated and combined into a record for a particular flow, session or call on network 100. These data packets or messages may be captured in capture files. A call trace application may be used to categorize messages into calls and to create Call Detail Records (CDRs). These calls may belong to scenarios that are based on or defined by the underlying network. In an illustrative, non-limiting example, related packets can be correlated using a 5-tuple association mechanism. Such a 5-tuple association process may use an IP correlation key that includes 5 parts: server IP address, client IP address, source port, destination port, and Layer 4 Protocol (Transmission Control Protocol (TCP), User Datagram Protocol (UDP) or Stream Control Transmission Protocol (SCTP)).

Accordingly, network monitoring system 103 may be configured to sample (e.g., unobtrusively through duplicates) related data packets for a communication session in order to track the same set of user experience information for each session and each client without regard to the protocol (e.g., HTTP, RTMP, RTP, etc.) used to support the session. For example, monitoring system 103 may be capable of identifying certain information about each user's experience, as described in more detail below. A service provider may use this information, for instance, to adjust network services available to endpoints 102a-102b, such as the bandwidth assigned to each user, and the routing of data packets through network 100.

As the capability of network 100 increases toward 10 GE and beyond (e.g., 100 GE), each link 104 may support more user flows and sessions. Thus, in some embodiments, link 104 may be a 10 GE or a collection of 10 GE links (e.g., one or more 100 GE links) supporting thousands or tens of thousands of users or subscribers. Many of the subscribers may have multiple active sessions, which may result in an astronomical number of active flows on link 104 at any time, where each flow includes many packets.

Figure 2:
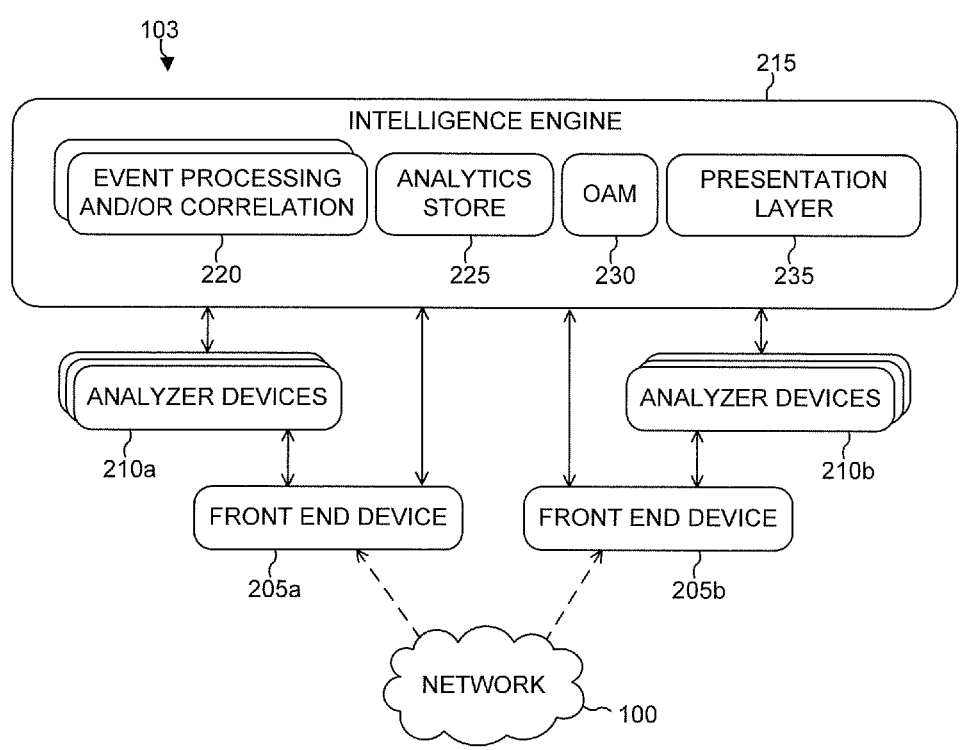
FIG. 2 is a high level diagram for an example of a network monitoring system employed as part of the network monitoring environment of FIG. 1.

FIG. 2 is a high level diagram for an example of a network monitoring system employed as part of the network monitoring environment of FIG. 1. As shown, one or more front-end monitoring devices or probes 205a and 205b, which may form a first tier of a three-tiered architecture, may be coupled to network 100. Each front-end device 205a-205b may also each be coupled to one or more network analyzer devices 210a, 210b (i.e., a second tier), which in turn may be coupled to intelligence engine 215 (i.e., a third tier). Front-end devices 205a-205b may alternatively be directly coupled to intelligence engine 215, as described in more detail below. Typically, front-end devices 205a-205b may be capable of or configured to process data at rates that are higher (e.g., about 10 or 100 times) than analyzers 210a-210b. Although the system of FIG. 2 is shown as a three-tier architecture, it should be understood by a person of ordinary skill in the art in light of this disclosure that the principles and techniques discussed herein may be extended to a smaller or larger number of tiers (e.g., a single-tiered architecture, a four-tiered architecture, etc.). In addition, it will be understood that the front-end devices 205a-205b, analyzer devices 210a-210b, and intelligence engine 215 are not necessarily implemented as physical devices separate from the network 100, but may instead be implemented as software processing modules executing on programmable physical processing resources within the nodes 101a-101d of network 100.

Generally speaking, front-end devices 205a-205b may passively tap into network 100 and monitor all or substantially all of its data. For example, one or more of front-end devices 205a-205b may be coupled to one or more links 104 of network 100 shown in FIG. 1. Meanwhile, analyzer devices 210a-210b may receive and analyze a subset of the traffic that is of interest, as defined by one or more rules. Intelligence engine 215 may include a plurality of distributed components configured to perform further analysis and presentation of data to users. For example, intelligence engine may include: Event Processing and/or Correlation (EPC) component(s) 220; analytics store 225; Operation, Administration, and Maintenance (OAM) component(s) 230; and presentation layer 235. Each of those components may be implemented in part as software processing modules executing on programmable physical processing resources, either within a distinct physical intelligence engine device or within the nodes 101a-101d of network 100.

In some embodiments, front-end devices 205a-205b may be configured to monitor all of the network traffic (e.g., 10 GE, 100 GE, etc.) through the links to which the respective front-end device 205a or 205b is connected. Front-end devices 205a-205b may also be configured to intelligently distribute traffic based on a user session level. Additionally or alternatively, front-end devices 205a-205b may distribute traffic based on a transport layer level. In some cases, each front-end device 205a-205b may analyze traffic intelligently to distinguish high-value traffic from low-value traffic based on a set of heuristics. Examples of such heuristics may include, but are not limited to, use of parameters such as IMEI (International Mobile Equipment Identifier) TAC code (Type Allocation Code) and SVN (Software Version Number) as well as a User Agent Profile (UAProf) and/or User Agent (UA), a customer list (e.g., international mobile subscriber identifiers (IMSI), phone numbers, etc.), traffic content, or any combination thereof. Therefore, in some implementations, front-end devices 205a-205b may feed higher-valued traffic to a more sophisticated one of analyzers 210a-210b and lower-valued traffic to a less sophisticated one of analyzers 210a-210b (to provide at least some rudimentary information).

Front-end devices 205a-205b may also be configured to aggregate data to enable backhauling, to generate netflows and certain Key Performance Indicator (KPI) calculations, time stamping of data, port stamping of data, filtering out unwanted data, protocol classification, and deep packet inspection (DPI) analysis. In addition, front-end devices 205a-205b may be configured to distribute data to the back-end monitoring tools (e.g., analyzer devices 210a-210b and/or intelligence engine 215) in a variety of ways, which may include flow-based or user session-based balancing. Front-end devices 205a-205b may also receive dynamic load information such as central processing unit (CPU) and memory utilization information from each of analyzer devices 210a-210b to enable intelligent distribution of data.

Analyzer devices 210a-210b may be configured to passively monitor a subset of the traffic that has been forwarded to it by the front-end device(s) 205a-205b. Analyzer devices 210a-210b may also be configured to perform stateful analysis of data, extraction of key parameters for call correlation and generation of call data records (CDRs), application-specific processing, computation of application-specific KPIs, and communication with intelligence engine 215 for retrieval of KPIs (e.g., in real-time and/or historical mode). In addition, analyzer devices 210a-210b may be configured to notify front-end device(s) 205a-205b regarding its CPU and/or memory utilization so that front-end device(s) 205a-205b can utilize that information to intelligently distribute traffic.

Intelligence engine 215 may follow a distributed and scalable architecture. In some embodiments, EPC module 220 may receive events and may correlate information from front-end devices 205a-205b and analyzer devices 210a-210b, respectively. OAM component(s) 230 may be used to configure and/or control front-end device(s) 205a and/or 205b and analyzer device(s) 210, distribute software or firmware upgrades, etc. Presentation layer 235 may be configured to present event and other relevant information to the end-users. Analytics store 225 may include a storage or database for the storage of analytics data or the like.

In some implementations, analyzer devices 210a-210b and/or intelligence engine 215 may be hosted at an offsite location (i.e., at a different physical location remote from front-end devices 205a-205b). Additionally or alternatively, analyzer devices 210a-210b and/or intelligence engine 215 may be hosted in a cloud environment.

Figure 3:
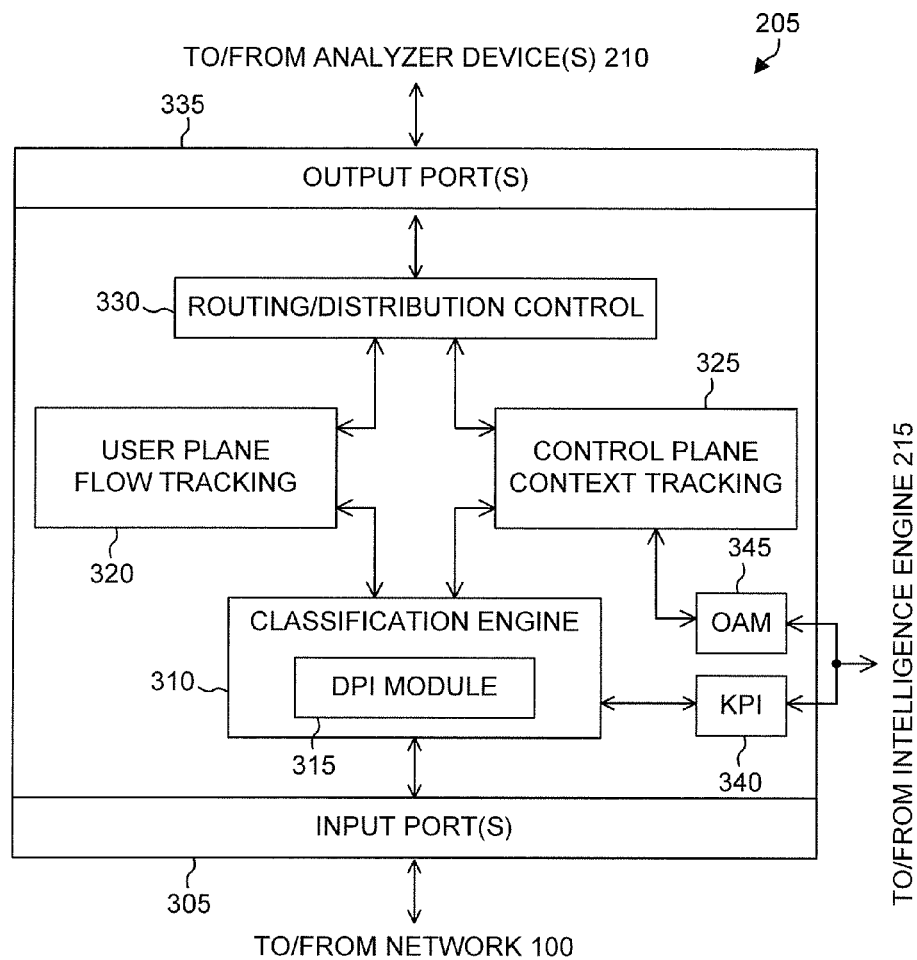
FIG. 3 is a high level diagram for an example of a network monitoring probe within the network monitoring system of FIG. 2.

FIG. 3 is a high level diagram for an example of a network monitoring probe within the network monitoring system of FIG. 2. Input port(s) 305 for the network monitoring probe 205 implements by front-end device 205 (which may be either of front-end devices 205a and 205b in the example depicted in FIG. 2 or a corresponding device not shown in FIG. 2) may have throughput speeds of, for example, 8, 40, or 100 gigabits per second (Gb/s) or higher. Input port(s) 305 may be coupled to network 100 and to classification engine 310, which may include DPI module 315. Classification engine 310 may be coupled to user plane (UP) flow tracking module 320 and to control plane (CP) context tracking module 325, which in turn may be coupled to routing/distribution control engine 330. Routing engine 330 may be coupled to output port(s) 335, which in turn may be coupled to one or more analyzer devices 210a and/or 210b. In some embodiments, KPI module 340 and OAM module 345 may also be coupled to classification engine 310 and/or tracking modules 320 and 325, as well as to intelligence engine 215.

In some implementations, each front-end probe or device 205 may be configured to receive traffic from network 100, for example, at a given data rate (e.g., 10 Gb/s, 100 Gb/s, etc.), and to transmit selected portions of that traffic to one or more analyzers 210a and/or 210b, for example, at a different data rate. Classification engine 310 may identify user sessions, types of content, transport protocols, etc. (e.g., using DPI module 315) and transfer UP packets to flow tracking module 320 and CP packets to context tracking module 325. In some cases, classification engine 310 may implement one or more rules to allow it to distinguish high-value traffic from low-value traffic and to label processed packets accordingly. Routing/distribution control engine 330 may implement one or more load balancing or distribution operations, for example, to transfer high-value traffic to a first analyzer and low-value traffic to a second analyzer. Moreover, KPI module 340 may perform basic KPI operations to obtain metrics such as, for example, bandwidth statistics (e.g., per port), physical frame/packet errors, protocol distribution, etc.

The OAM module 345 of each front-end device 205 may be coupled to OAM module 230 of intelligence engine 215 and may receive control and administration commands, such as, for example, rules that allow classification engine 310 to identify particular types of traffic. For instance, based on these rules, classification engine 310 may be configured to identify and/or parse traffic by user session parameter (e.g., IMEI, IP address, phone number, etc.). In some cases, classification engine 310 may be session context aware (e.g., web browsing, protocol specific, etc.). Further, front-end device 205 may be SCTP connection aware to ensure, for example, that all packets from a single connection are routed to the same one of analyzers 210a and 210b.

In various embodiments, the components depicted for each front-end device 205 may represent sets of software routines and/or logic functions executed on physical processing resource, optionally with associated data structures stored in physical memories, and configured to perform specified operations. Although certain operations may be shown as distinct logical blocks, in some embodiments at least some of these operations may be combined into fewer blocks. Conversely, any given one of the blocks shown in FIG. 3 may be implemented such that its operations may be divided among two or more logical blocks. Moreover, although shown with a particular configuration, in other embodiments these various modules may be rearranged in other suitable ways.

Figure 4:
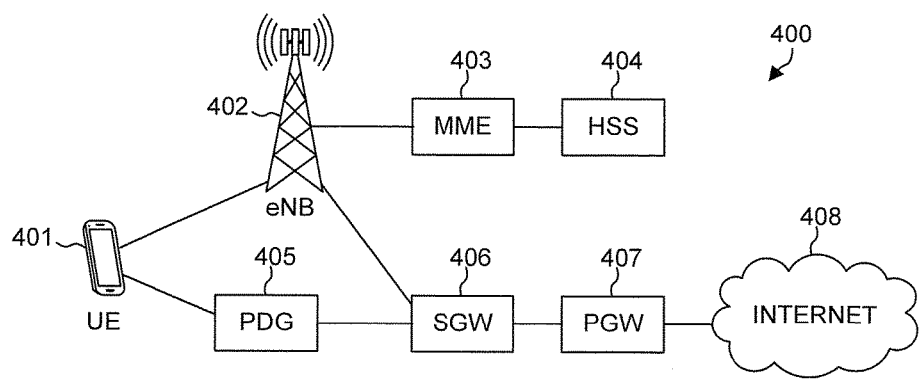
FIG. 4 is a diagram of an exemplary 3GPP SAE network for which the network monitoring system of FIGS. 1 and 2 may be deployed according to some embodiments of the present disclosure.

FIG. 4 is a diagram of an exemplary 3GPP SAE network for which the network monitoring system of FIGS. 1 and 2 may be deployed according to some embodiments of the present disclosure. The 3GPP network 400 depicted in FIG. 4 may form the network portion of FIG. 1 and may include the monitoring system 103 (not shown in FIG. 4). As illustrated, User Equipment (UE) 401 is coupled to one or more Evolved Node B (eNodeB or eNB) base station(s) 402 and to Packet Data Gateway (PDG) 405. Meanwhile, eNB 402 is also coupled to Mobility Management Entity (MME) 403, which is coupled to Home Subscriber Server (HSS) 404. PDG 405 and eNB 402 are each coupled to Serving Gateway (SGW) 406, which is coupled to Packet Data Network (PDN) Gateway (PGW) 407, and which in turn is coupled to Internet 408, for example, via an IMS (not shown).

Generally speaking, eNB 402 may include hardware configured to communicate with UE 401. MME 403 may serve as a control-node for the access portion of network 400, responsible for tracking and paging UE 401, coordinating retransmissions, performing bearer activation/deactivation processes, etc. MME 403 may also be responsible for authenticating a user (e.g., by interacting with HSS 404). HSS 404 may include a database that contains user-related and subscription-related information to enable mobility management, call and session establishment support, user authentication and access authorization, etc. PDG 405 may be configured to secure data transmissions when UE 401 is connected to the core portion of network 400 via an untrusted access. SGW 406 may route and forward user data packets, and PDW 407 may provide connectivity from UE 401 to external packet data networks, such as, for example, Internet 408.

In operation, one or more of elements 402-407 may perform one or more Authentication, Authorization and Accounting (AAA) operation(s), or may otherwise execute one or more AAA application(s). For example, typical AAA operations may allow one or more of elements 402-407 to intelligently control access to network resources, enforce policies, audit usage, and/or provide information necessary to bill a user for the network's services.

In particular, "authentication" provides one way of identifying a user. An AAA server (e.g., HSS 404) compares a user's authentication credentials with other user credentials stored in a database and, if the credentials match, may grant access to the network. Then, a user may gain "authorization" for performing certain tasks (e.g., to issue predetermined commands), access certain resources or services, etc., and an authorization process determines whether the user has authority to do so. Finally, an "accounting" process may be configured to measure resources that a user actually consumes during a session (e.g., the amount of time or data sent/received) for billing, trend analysis, resource utilization, and/or planning purposes. These various AAA services are often provided by a dedicated AAA server and/or by HSS 404. A standard protocol may allow elements 402, 403, and/or 405-407 to interface with HSS 404, such as the Diameter protocol that provides an AAA framework for applications such as network access or IP mobility and is intended to work in both local AAA and roaming situations. Certain Internet standards that specify the message format, transport, error reporting, accounting, and security services may be used in the standard protocol.

Although FIG. 4 shows a 3GPP SAE network 400, it should be noted that network 400 is provided as an example only. As a person of ordinary skill in the art will readily recognize in light of this disclosure, at least some of the techniques described herein may be equally applicable to other types of networks including other types of technologies, such as Code Division Multiple Access (CDMA), $2^{nd}$ Generation CDMA (2G CDMA), Evolution-Data Optimized $3^{rd}$ Generation (EVDO 3G), etc.

Figure 5:
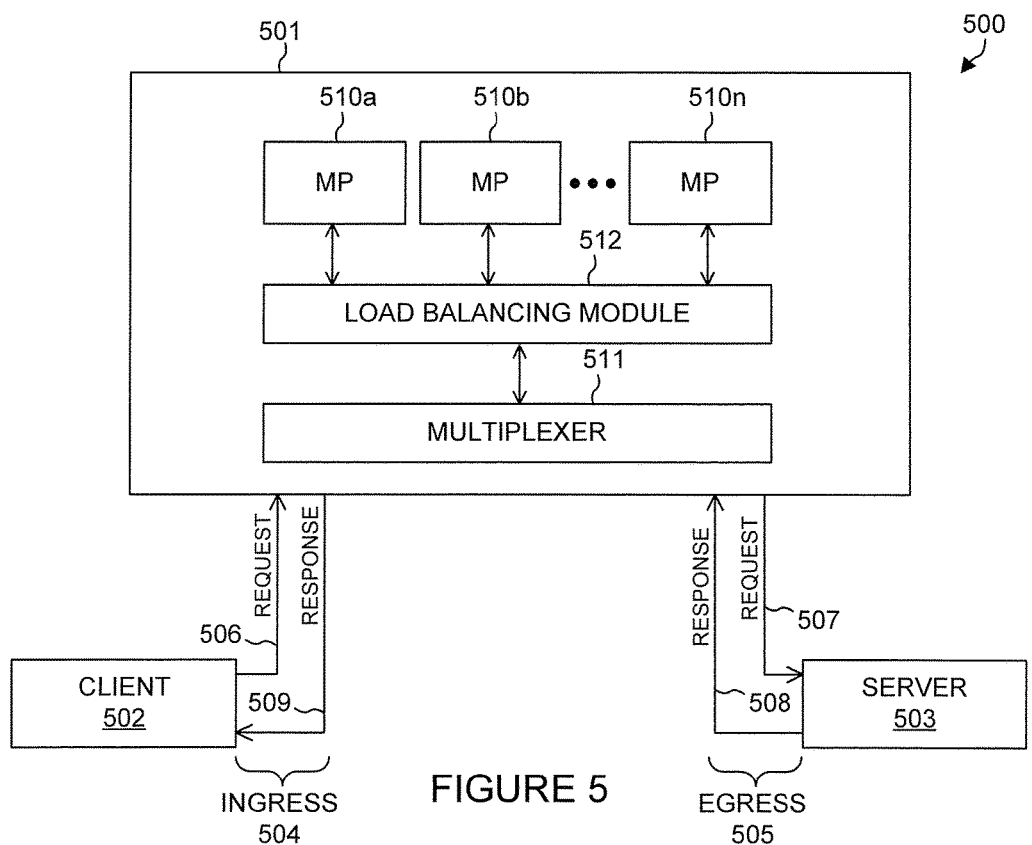
FIG. 5 is a high level diagram for an example of a portion of a network where the network monitoring system of FIGS. 1 and 2 may be deployed according to some embodiments of the present disclosure.

FIG. 5 is a high level diagram for an example of a portion of a network where the network monitoring system of FIGS. 1 and 2 may be deployed according to some embodiments of the present disclosure. As shown, client 502 communicates with routing device or core 501 via ingress interface or hop 504, and routing core 501 communicates with server 503 via egress interface or hop 505. Examples of client 502 include, but are not limited to, MME 403, SGW 406, and/or PGW 407 depicted in FIG. 4, whereas examples of server 503 include HSS 404 depicted in FIG. 4 and/or other suitable AAA server. Routing core 501 may include one or more routers or routing agents such as Diameter Signaling Routers (DSRs) or Diameter Routing Agents (DRAs), generically referred to as Diameter Core Agents (DCAs).

In order to execute AAA application(s) or perform AAA operation(s), client 502 may exchange one or more messages with server 503 via routing core 501 using the standard protocol. Particularly, each call may include at least four messages: first or ingress request 506, second or egress request 507, first or egress response 508, and second or ingress response 509. The header portion of these messages may be altered by routing core 501 during the communication process, thus making it challenging for a monitoring solution to correlate these various messages or otherwise determine that those messages correspond to a single call.

In some embodiments, however, the systems and methods described herein enable correlation of messages exchanged over ingress hops 504 and egress hops 505. For example, ingress and egress hops 504 and 505 of routing core 501 may be correlated by monitoring system 103, thus alleviating the otherwise costly need for correlation of downstream applications.

In some implementations, monitoring system 103 may be configured to receive (duplicates of) first request 506, second request 507, first response 508, and second response 509. Monitoring system 103 may correlate first request 506 with second response 509 into a first transaction, and may also correlate second request 507 with first response 508 into a second transaction. Both transactions may then be correlated as a single call and provided in an External Data Representation (XDR) or the like. This process may allow downstream applications to construct an end-to-end view of the call and provide KPIs between LTE endpoints.

Also, in some implementations, Intelligent Delta Monitoring may be employed, which may involve processing ingress packets fully but then only a "delta" in the egress packets. Particularly, the routing core 501 may only modify a few specific Attribute-Value Pairs (AVPs) of the ingress packet's header, such as IP Header, Origin-Host, Origin-Realm, and Destination-Host. Routing core 501 may also add a Route-Record AVP to egress request messages. Accordingly, in some cases, only the modified AVPs may be extracted without performing full decoding transaction and session tracking of egress packets. Consequently, a monitoring probe with a capacity of 200,000 Packets Per Second (PPS) may obtain an increase in processing capacity to 300,000 PPS or more—that is, a 50% performance improvement—by only delta processing egress packets. Such an improvement is important when one considers that a typical implementation may have several probes monitoring a single DCA, and several DCAs may be in the same routing core 501. For ease of explanation, routing core 501 of FIG. 5 is assumed to include a single DCA, although it should be noted that other implementations may include a plurality of DCAs.

Additionally or alternatively, the load distribution within routing core 501 may be measured and managed. Each routing core 501 may include a plurality of message processing (MP) blades and/or interface cards 510a, 510b, . . . , 510n, each of which may be associated with its own unique origin host AVP. In some cases, using the origin host AVP in the egress request message as a key may enable measurement of the load distribution within routing core 501 and may help in troubleshooting. As illustrated, multiplexer module 511 within routing core 501 may be configured to receive and transmit traffic from and to client 502 and server 503. Load balancing module 512 may receive traffic from multiplexer 511 and may allocate that traffic across various MP blades 510a-510n and even to specific processing elements on a given MP blade in order to optimize or improve operation of core 501.

For example, each of MP blades 510a-510n may perform one or more operations upon packets received via multiplexer 511, and may then send the packets to a particular destination, also via multiplexer 511. In that process, each of MP blades 510a-510n may alter one or more AVPs contained in these packets, as well as add new AVPs to the packets (typically to the header). Different fields in the header of request and response messages 506-509 may enable network monitoring system 103 to correlate the corresponding transactions and calls while reducing or minimizing the number of operations required to performs such correlations.

Figure 6:
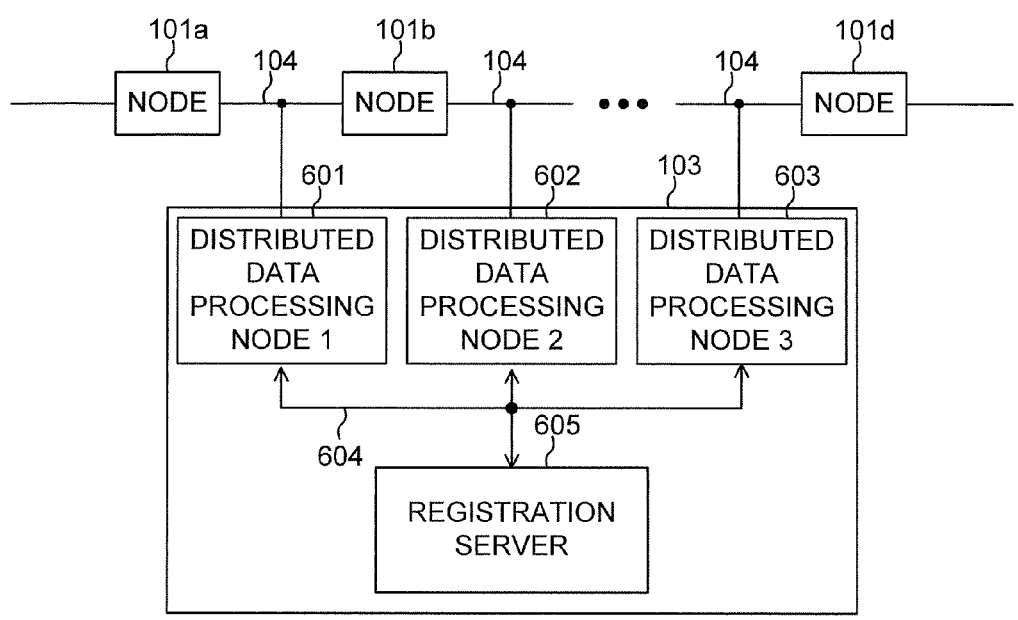
FIG. 6 is a diagram illustrating self-localizing distributed processing and data distribution according to embodiments of the present disclosure.

FIG. 6 is a diagram illustrating self-localizing distributed processing and data distribution according to embodiments of the present disclosure. In the present disclosure, data processing necessary to accomplish the objectives of network monitoring is distributed among a plurality of distributed data processing nodes 601, 602 and 603 in the network monitoring system 103. In many implementations, network monitoring system 103 is likely to have far more than the three distributed data processing nodes 601, 602 and 603 within the distributed data processing system depicted in FIG. 6 for network monitoring system 103, but for simplicity and clarity only three distributed data processing nodes are shown. While depicted as separate devices from network nodes 101a-101d of the network being monitored, each distributed data processing node 601, 602 and 603 may actually be implemented within the same computer hardware as one of nodes 101a-101d, as described above. Each distributed data processing node 601, 602 and 603 may include the front-end device(s) 205a-205b, analyzer devices 210a-210b, and intelligence engine 215 depicted in FIG. 2, may be part of or co-located with eNB 402 depicted in FIG. 4 for monitoring communications to and from eNB 402, and/or may be part of or co-located with routing device or core 501 depicted in FIG. 5 for monitoring traffic to and from server 503 by one or more clients such as client 502.

In the exemplary embodiment, distributed data processing nodes 601, 602 and 603 are geographically distributed, each located in a different city or even in different states or countries. Each distributed data processing node 601, 602 and 603 is communicably coupled by data transport 604 to all of the other distributed data processing nodes in network monitoring system 103, and is able to transmit and receive processing or data access requests from the remaining distributed data processing nodes. Each distributed data processing node 601, 602 and 603 is also communicably coupled by data transport 604 to a registration or control server 605. The data transport 604 may be wireless, wired, or some combination and may employ any of the communication devices and protocols described herein. A more detailed depiction of distributed data processing nodes 601, 602 and 603 is provided in FIG. 6A, which relates to distributed data processing node 601 but which also depicts the structure of distributed data processing nodes 602 and 603, since all distributed data processing nodes have substantially identical structure for the purposes of the example described. Notably, distributed data processing nodes 601, 602 and 603 are sometimes connected directly to data sources or to data consumers, and are sometimes connected only to other nodes. The former situation is most often the case when any given node within the distributed data processing system is capable of performing the complete processing for new input data or for consumer reports, while the latter situation is more common in more complex instantiations wherein certain distributed data processing nodes have specialized capabilities.

Figures 7A, 7B:
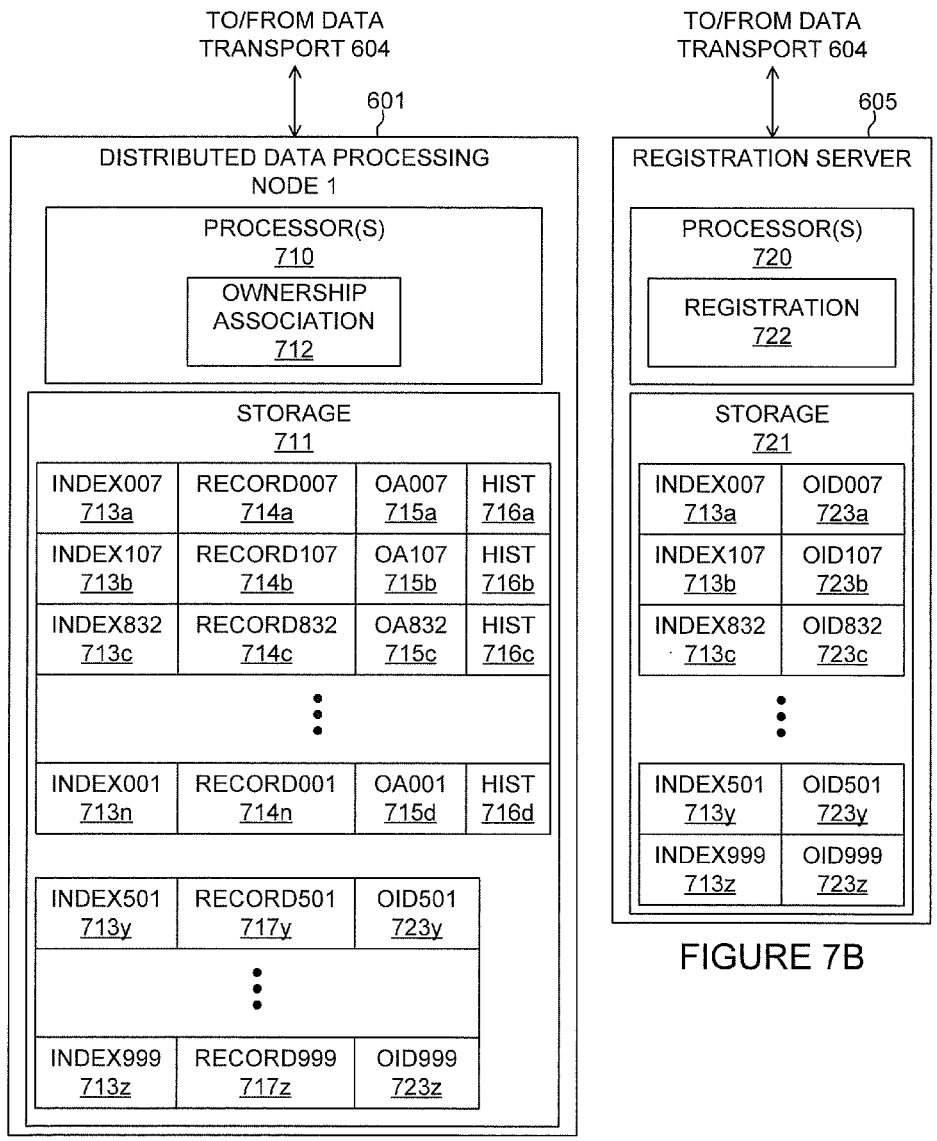
FIGS. 7A and 7B are diagrams illustrating additional details of components within self-localizing distributed processing and data distribution depicted in FIG. 6.

FIGS. 7A and 7B are diagrams illustrating additional details of components within self-localizing distributed processing and data distribution depicted in FIG. 6. Self-localizing data processing and data distribution by the distributed data processing system of the present disclosure also acts as a distributed database, and further supports moving data to the appropriate node to minimize overall transport time in supporting processing requests made to that data. Each distributed data processing node 601 includes a processor 710 executing instructions to perform the process(es) described herein and a memory and/or other data storage 711 for the local instance of the distributed database. The distributed data processing node can (and frequently does) also perform operations on the data, which typically involve updating a record, such as the record of transactions and a current state of a real-world item. A given record is "owned" by a particular distributed data processing node. In the example shown, distributed data processing node 601 "owns" records 714a, 714b, 714c, . . . , 714n, and the authoritative copies of those records are maintained within storage 711 at distributed data processing node 601. Duplicates of one or more of those records 714a-714n may be found in other distributed data processing nodes within the distributed data processing system, but in event of discrepancies between two or more copies of a given record, the version of the record within storage 711 of the distributed data processing node 601 owning the record is kept and other versions are discarded. Ownership of a given record is maintained within the distributed data processing node closest (where "closest" is evaluated in terms of network data transport costs) to one of the source of input data relating the respective record and the destination of a required report regarding the respective record. Thus, for example, record 714b relating to analysis of transactions at network node 101a may be owned by the distributed data processing node 601 most directly connected to network node 101a, requiring (for example) the fewest hops for transfer of the data to any of distributed data processing nodes 601, 602 and 603. Other metrics for data transport costs may be employed for determining which distributed data processing node is closest to the source of input data, but in a geographically dispersed system of network nodes 101a-101d and distributed data processing nodes 601-603, the distributed data processing node 601 that forms part of or that is co-located with a given source network node 101a is most likely to utilize less data transfer resources. For that reason, ownership of a record may be initially assigned to the distributed data processing node 601 that is physically closest to the source network node 101a when the record is created.

Each record is indexed by a single key 713a, 713b, 713c, . . . , 713n uniquely identifying the respective record 714a, 714b, 714c, . . . , 714n to any of distributed data processing nodes 601, 602 and 603 and registration server 605. Multi-key operation is also possible by creating data with a different key that references the original key. The index key 713a-713n is employed by all distributed data processing nodes 601, 602 and 603 and by registration server 605 to locate and access (whether for read or write purposes) the respective record 714a-714n. Accordingly, the index keys 713a-713n are maintained in association with the respective records 714a-714n in storage 711 of a distributed data processing node 601.

As illustrated in FIG. 7A, an ownership association (OA) value 715a-715n and access history data 716a-716n are also maintained, within storage 711, in association with each record 713a-713n owned by a distributed data processing node 601. The ownership association values 715a-715n and access history data 716a-716n are employed to dynamically transfer ownership of the corresponding record as described in further detail below. Storage 711 may also contain duplicates or backups of records 717y-717z owned by other distributed data processing nodes. The index key 713y-713z identifying the records 717y-717z is maintained in association with the record copies in storage 711, together with ownership identifiers 723y-723z. Where duplicates of records not owned by the distributed data processing node 601 are cached locally in storage 711, no ownership association value is associated with the duplicate or backup record in storage 711 but is instead maintained in the storage of the distributed data processing node 602 or 603 owning the respective record.

Each record and the corresponding ownership are "registered" with a central control or registration server 605, or alternatively a set of distributed servers (such as a zookeeper group). As illustrated in FIG. 7B, the registration server 605 includes memory and/or other data storage 721 containing the index keys 713a-713z for all records in linked association with ownership identifiers 723a-723z for the distributed data processing node 601, 602 or 603 owning the respective record. Since the registration server 605 contains registration information for all distributed data processing nodes 601-603 within the system, storage 721 will naturally contain index keys (such as index keys 713y and 713z) for records 717y-717z not owned by distributed data processing node 601 and, in some cases, not found in storage 711. Index keys 713y and 713z together with the linked ownership identifiers 723y and 723z for the respective records. The ownership identifiers 723y and 723z will identify one of distributed data processing nodes 602 or 603 in the example being described. For example, the record indexed by key 713y may be owned by distributed data processing node 602, while the record indexed by key 713z may be owned by distributed data processing node 603. When distributed data processing node 601 requires access to a record not contained within storage 711, the distributed data processing node 601 may request an ownership indication from registration server 605 and receive in response from the registration server 605 the ownership identifier for the record in question (e.g., ownership identifier 723y for the record corresponding to index key 713y). Likewise distributed data processing nodes 602 and 603 may obtain ownership identifiers for records not contained within their respective storage. Registration functionality 722 executing within a processor 720 in registration server 605 handles both requests for registration of the ownership of a new record and requests for an ownership indication regarding an existing record.

Localization

As noted above, a given record is "owned" by a particular distributed data processing node, and edits to that record require communication with that distributed data processing node when the edits are to be performed for a non-owner. In a self-localizing system according to this disclosure, the steady state should be that most record updates are due to new input data that arrives at the distributed data processing node that owns the record to be updated. In a dynamic environment where updates for a record might migrate between data sources, achieving that steady state requires an ability to adjust record ownership to minimize overall bandwidth costs. In an exemplary implementation, a node can request registration for a particular record when it requires (read or update) access to that record.

Figure 8:
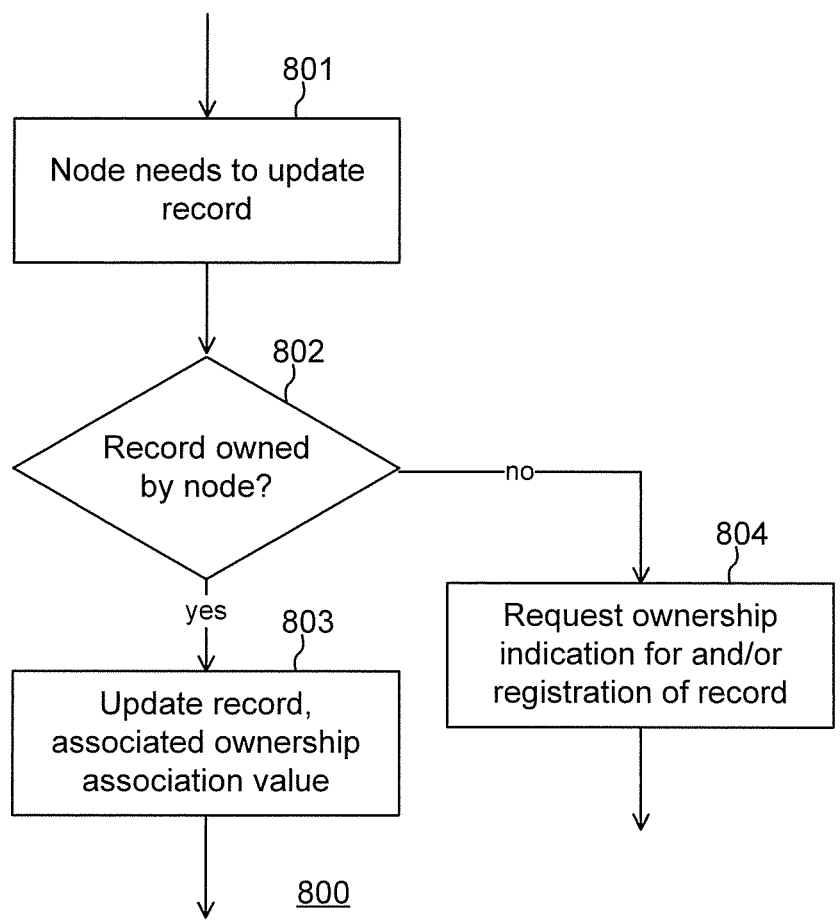
FIG. 8 is a flowchart illustrating a portion of operation of the network monitoring system of FIGS. 1 and 2 during update of a record forming part of distributed data in a distributed data processing system according to embodiments of the present disclosure.

FIG. 8 is a flowchart illustrating a portion of operation of the network monitoring system of FIGS. 1 and 2 during update of a record forming part of distributed data in a distributed data processing system according to embodiments of the present disclosure. The update process 800 may be performed by a processor or processing element 710 within the distributed data processing node 601 needing to update a record, as in the example illustrated, or alternatively by the processor/processing element within any other distributed data processing node 602 or 603 needing to update a record. Data processing within the distributed data processing node 601 in the course of network monitoring may result in a need to update a specific record (step 801). In connection with processing the necessary record update, the distributed data processing node 601 may determine whether it owns the record to be updated (step 802). For example, distributed data processing node 601 owning the record 713c and needing to update that record may determine its ownership of the record 613c from at least the existence of the associated ownership association value 715c in storage 711. Alternatively, other attributes of a record stored or cached within storage 711 of the distributed data processing node 601 needing to update the respective record may be used by the distributed data processing node 601 to determine ownership of the record. If the record 713c needing update is owned by the distributed data processing node 601 seeking to perform the update, the distributed data processing node 601 updates the record 713c and, in a manner described in further detail below, the associated ownership association value 715c (step 803). In the event that the distributed data processing node 601 does not own the record 713c that needs updated, the distributed data processing node 601 requests (if necessary) an ownership indication for the record 713c from the registration server 605 and registration of the record 713c from the distributed data processing node owning the record 713c (step 804).

Figure 9:
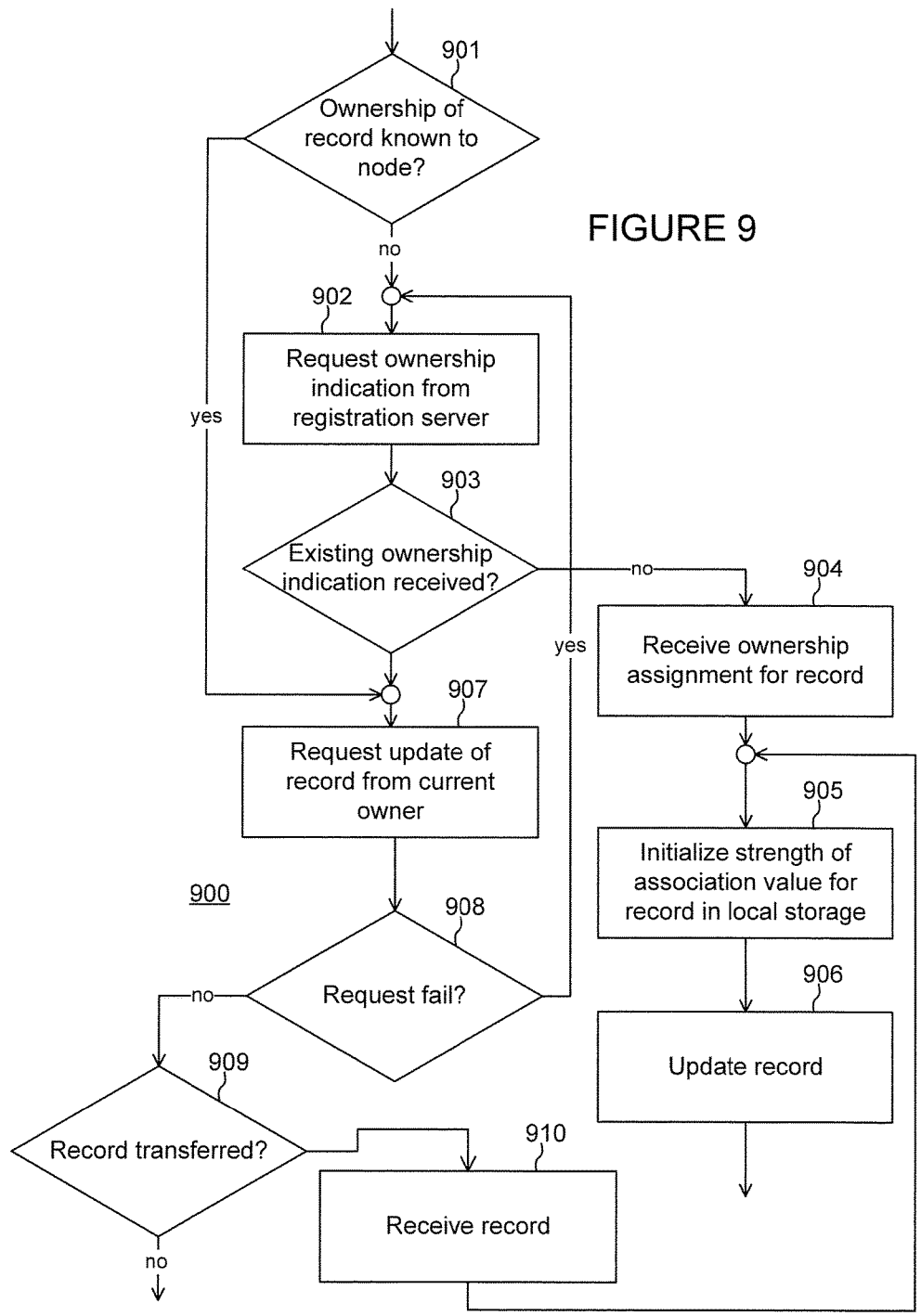
FIG. 9 is a flowchart illustrating a portion of operation of the network monitoring system of FIGS. 1 and 2 during a request for registration of a record forming part of distributed data in a distributed data processing system according to embodiments of the present disclosure.

FIG. 9 is a flowchart illustrating a portion of operation of the network monitoring system of FIGS. 1 and 2 during a request for registration of a record forming part of distributed data in a distributed data processing system according to embodiments of the present disclosure. The registration process 900 may be performed by a processor or processing element 601 within the distributed data processing node 601 needing to update a record not owned by the distributed data processing node 601, as in the example illustrated, or alternatively by the processor/processing element within any other distributed data processing node 602 or 603 needing to update a record owned by another distributed data processing node. The registration process 900 includes the distributed data processing node 601 determining whether ownership of the record of interest is known to the distributed data processing node 601 (step 901). For example, if the distributed data processing node 601 had previously accessed the record corresponding to index key 713y, storage 711 may contain a copy 717y of the record (as last accessed) together with a linked duplicate of the ownership identifier 723y received from the registration server 605 in connection with the prior access or, in the case of multiple prior accesses of the record indexed by key 713y, the most recent access.

If the distributed data processing node 601 does not know the current owner of the record to be updated, the distributed data processing node 601 requests an ownership indication for that record from the registration server(s) 605 (step 903) to determine the owner. If there is no current owner for the subject record, the registration server(s) 605 will assign ownership for the record to the requesting distributed data processing node 601, setting that node as the owner. The distributed data processing node 601 will receive an ownership assignment for the record to be updated from the registration server(s) 605 (step 904). The distributed data processing node 601 may then initialize an ownership association value for the record in local storage 711 (step 905), and update the record (step 906).

If an ownership indication for the record to be updated is received from the registration server(s) (at step 903), or if the ownership of the record to be updated was known to the distributed data processing node 601 (at step 901), the distributed data processing node 601 communicates with the current owner to request update of the record (step 907). If the owner of the record to be updated has changed, the registration request may "fail" or receive an error response indicating that the contacted distributed data processing node does not currently own that record (step 908). In that event, the distributed data processing node 601 requests—or once again requests—an ownership indication for the record to be updated from the registration server(s) 605 (step 902). The request for update of the record is also a tacit or implied request for registration (i.e., change of ownership) of the respective record, as discussed in further detail below. Accordingly, if no ownership registration error is returned, ownership for the record to be updated may be transferred based on the change in the ownership association for the record at the current owner produced by the update request, as described above. If ownership is not transferred (step 909), the distributed data processing node 601 may simply proceed to other processing tasks without taking further action. The current owner of the record to be updated should update the record based on the callback and associated data forwarded with the update request. When ownership for the record to be updated is being transferred by the current owner to the requesting distributed data processing system 601 (at step 909), the distributed data processing node 601 should receive the record to be updated (step 910) in the current state of that record from the current owner (now previous) record owner. Upon receiving a transferred record (at step 910), the distributed data processing node 601 initializes an ownership association value for the transferred record in local storage 611 (step 905) and updates the record (step 906).

When ownership for the record to be updated is being transferred by the current owner to the requesting distributed data processing system 601, update of the record is performed by the current owner. For efficiency, the request for update should include a callback and associated data enabling the required record update. That is, the update request functions as a combined registration and record update request. In this way, the distributed data processing system can execute operations on either the original owner node or the new owner node to minimize transport costs. Accordingly, when ownership for the record to be updated is not being transferred by the current owner to the requesting distributed data processing system 601, no further action should be required by the distributed data processing system 601.

Figure 10:
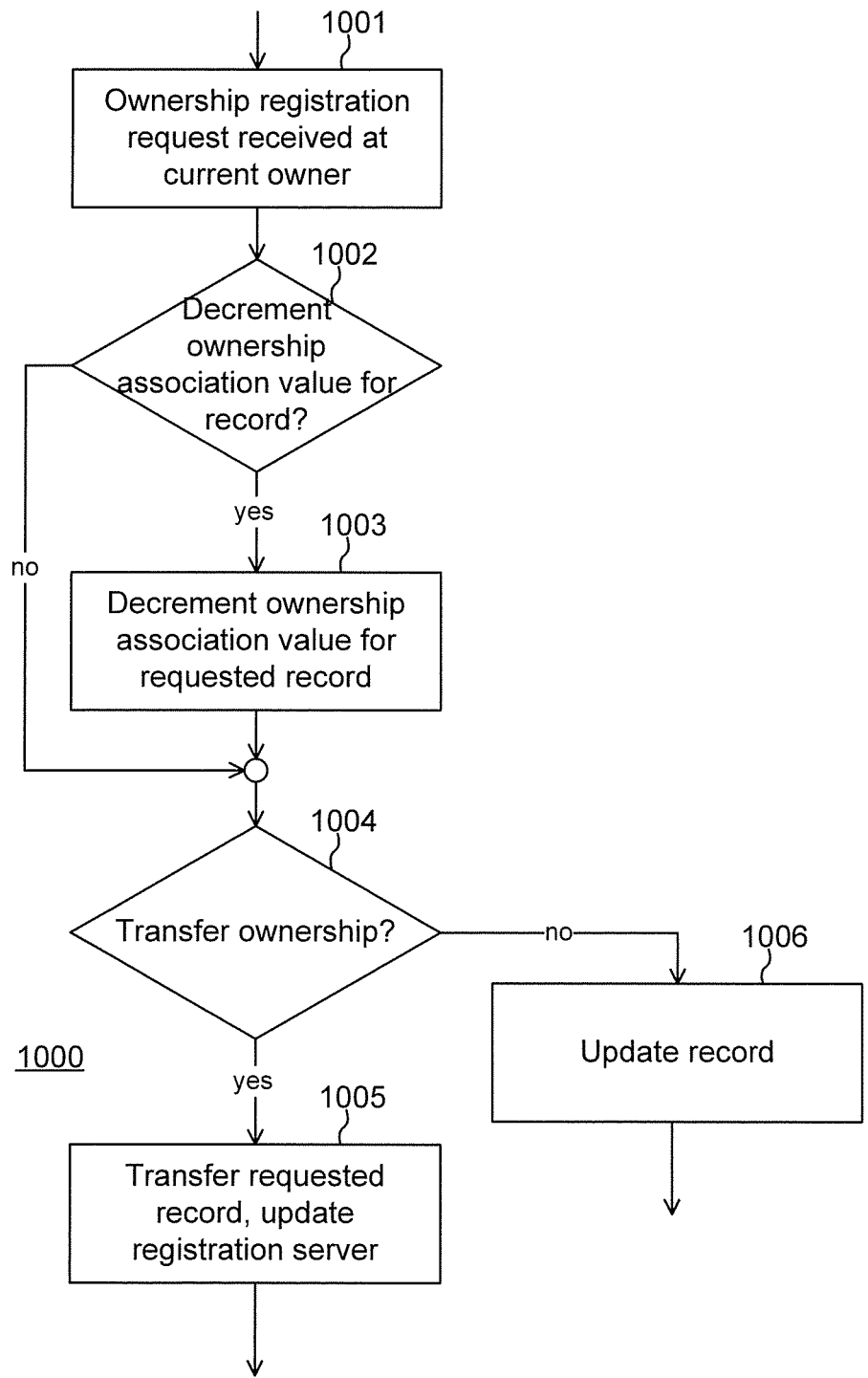
FIG. 10 is a flowchart illustrating a portion of operation of the network monitoring system of FIGS. 1 and 2 during a determination of ownership transfer for a record forming part of distributed data in a distributed data processing system according to embodiments of the present disclosure.

FIG. 10 is a flowchart illustrating a portion of operation of the network monitoring system of FIGS. 1 and 2 during a determination of ownership transfer for a record forming part of distributed data in a distributed data processing system according to embodiments of the present disclosure. The ownership transfer determination process 1000 may be performed by a processor or processing element 710 within the distributed data processing node 601 receiving a registration request for a record owned by the distributed data processing node 710, as in the example illustrated, or alternatively by the processor/processing element within any other distributed data processing node 602 or 603 receiving a registration request for a record owned by the other distributed data processing node. The ownership transfer determination process 1000 includes receiving a registration request for a currently owned record (step 1001).

In order to minimize data transport costs associated with both processing updates to records and record ownership transfer, ownership of a record should be changed if and only if the new owner node is more likely to receive data requiring update of the record in the future than the current owner distributed data processing node. In some cases, the data itself will indicate that future source data for record updates will come to the new owner node, a circumstance referred to as "dominant" data, forcing an ownership registration change. In other cases, an estimation or prediction is made on whether future source data for record updates will come to the new owner node on the basis of recent activity using a caching-type algorithm such as the one described herein. Of course, many different alternative caching algorithms may be used effectively in this general structure to achieve the data transfer cost reduction contemplated by the present disclosure.

As illustrated in FIG. 7A, each record 714a-714n owned by a particular distributed data processing node 601 includes or has associated a corresponding value 715a-715n, which is the ownership association for the respective record to the current owner node. The value for the ownership association is originally set or initialized to some small settable number, which may be modified based upon accesses to the record by different distributed data processing nodes to prevent "ping-pong" behavior in which ownership of the record and the record itself is repeatedly transferred among distributed data processing nodes, utilizing more data transfer resources that would have been used by simply maintaining prior ownership of the record. The modification of the ownership association value balances the data transfer resources utilized by updating a record as necessary based on inputs to a remote distributed data processing node with the data transfer resources utilized by transferring ownership of the record.

As illustrated in FIG. 8, when the owner node updates or reads the record, the corresponding ownership association value is updated (step 803). A reasonable ownership value update rule is to increment the existing ownership association value OA by 1 upon access to the record by the owner node if the existing ownership association value OA is less than 1, and increment the existing ownership association value OA by the inverse of the existing ownership association value (i.e., 1/OA) if the existing ownership association value OA is greater than 1. This ownership association value update rule makes the ownership association value converge to the log of the number of record accesses (updates/reads), ensuring that increased usage will increase ownership while also ensuring that a change in ownership can always be made with a reasonable number or proportion of consecutive accesses.

Referring back to FIG. 10, registration requests (e.g., step 1001) in the embodiment being described are intrinsically part of an access request by a distributed data processing node that is not the current owner of the record to be updated. For purposes of enabling adaptive ownership transfer in the absence of dominant data, the ownership association value 715 corresponding to a record 714c is updated upon each access of the record 714c by a non-owner distributed data processing node 602 or 603. When a different node updates or reads the record, the ownership association value is decremented. A default decrement of 1 is acceptable, but this should ideally be an adjustable amount that reflects the likelihood of future requests from the same non-owner distributed data processing node. For this purpose, the owner distributed data processing node 601 maintains access history data 716a-716n corresponding to a set of recent accesses to the associated record 714a-714n. The access history data may be a sliding window of the complete access history for the corresponding record, with an oldest access dropped from the access history data of a record each time a new access is added and/or with accesses exceeding a certain age being dropped. The use of access history data 716a-716n limits ownership transfers to, for example, situations where a mobile phone user changes a primary geographic area of use for at least a predefined period. For example, the mobile phone user might travel on business (or vacation) from their residence in a first city served by the first distributed data processing node 601 to another city or state served by the second distributed data processing node 602. If the relocation is brief, such as a few hours or less than one day, ownership transfer of a record associated with the mobile may not be warranted based on the data transfer costs in light of limited data transfer utilization for transmitting record updates requests. If the relocation is longer, such as at least a week or permanently, transferring ownership of the record to a node geographically closer to the source of input necessitating update of the record should reduce data transfer resource utilization for updates to that record.

Using the access history data for a record, based on a number or proportion of the recent accesses to the record that originated from the distributed data processing node currently requesting access, an amount is selected for decrementing (if at all) the ownership association value. Preferably, only the most common "second choice" node (the distributed data processing node with the second-highest number or proportion of the accesses indicated by the corresponding access history data, other than the owner node) should result in any decrement of the ownership association value for the record. In addition, an adaptive multiplier may be applied to the decrement amount when the access history data indicates that the most recent accesses to the record are two or more sequential accesses by the second choice node, with the multiplier optionally increasing according to the number of most recent sequential accesses by the second choice node.

In process 1000, a determination is made of whether to decrement the ownership association value for a requested record based on receipt of a registration request for the record (step 1002). As described above, the determination is preferably based upon the identity of the remote distributed data processing node making the registration request. If appropriate, the ownership association value for the requested record is decremented by an amount selected as described above (step 1003). Based on the updated ownership association value for the requested record, a determination of whether to transfer ownership is made (step 1004). For example, if the resultant ownership association value after being decremented based on the received registration request is less than 1, ownership of the record may be transferred to the distributed data processing node that sent the registration request. If transfer of ownership is indicated by the updated ownership association value, the requested record is transferred to the requesting distributed data processing node and the registration server(s) are informed of the ownership transfer (step 1005). If ownership is not transferred, the owner distributed data processing node 601 updates the record utilizing (for example) the callback and associated data within the registration request (step 1006).

Data Redundancy and Update Latency

As described above, copies of a record may be maintained on different distributed data processing nodes. In a redundant implementation, backup nodes do not have ownership for the records duplicated within local storage. Even if cached locally for redundancy purposes, records 717y-717z contained in local storage 711 for a non-owner distributed data processing node 601 typically should not directly update local copies, but instead should request update access (registration) from the owner node. Redundant copies of a record may be updated when the master copy of the record is updated, or at a different time (e.g., on a synchronization schedule) as required by the project's backup needs.

While the default approach described above implies strong consistency of the records, with no update latency, some update latency may be acceptable for some records. In that case, the redundant copies within a non-owner distributed data processing node may be used directly for read operations, although write operations may still go to the owner node.

Load Balancing

Some requests will require significant computational, memory, storage, or other resources. For those requests, resource requirements must be satisfied while still minimizing backhaul where possible. A request for a resource-demanding processing task should be sent as any other request, but with additional information about the resource demands. The additional information may take as simple of a form as a flag within the request that indicates the update request is resource intensive (e.g., computationally demanding).

In such a case, the ownership association value update rule(s) applied in process 800 (step 803) and/or process 1000 (steps 1002-1003) may consider the resources available on the different distributed data processing nodes. For example, if the current owner has highly-loaded data processing resources, more than 1 may be subtracted from the ownership association value corresponding to a record to be updated for resource-intensive processing tasks requested by a non-owner distributed data processing node. The owner distributed data processing node will thus be more likely to transfer ownership of the requested record to the requesting distributed data processing node. On the other hand, if the requesting distributed data processing node is highly loaded, then that non-owner distributed data processing system may indicate (by a flag, or the like) that it does not wish to take ownership of the record, effectively changing the registration request to a simple record access request. On receiving such a flagged registration/record update request, the current record owner may subtract less or even nothing from the ownership association value. If both the owner and requesting distributed data processing nodes are highly loaded, then the registration server may be checked to determine if one of the other distributed data processing nodes has with available resources. When the registration server checks for a distributed data processing node with available resources, the registration server should prefer a distributed data processing node that has a low data transfer cost from the current owner. To enable use of the registration server in assigning a processing task, each distributed data processing node should update the registration server with its current loading at a regular interval (typically as short as 1 second).

Heterogeneous Processing Capabilities

While the above description for FIGS. 8, 9 and 10 generally assumes that all distributed data processing nodes have all processing capabilities, in some implementations one distributed data processing node might have different or additional processing capabilities over the remaining distributed data processing nodes. For security reasons, for instance, only one distributed data processing node may have access to or be accessible from the Internet. More generally, instead of all distributed data processing nodes 601-603 providing fungible processing resources, one distributed data processing node 602 may have more storage than the remaining distributed data processing nodes 601 and 603, while distributed data processing node 603 may include a graphical co-processor to support image rendering. In such an embodiment, big data operations may best be processed with the additional storage locally available to distributed data processing node 602, while report generation may require the graphics-rendering capabilities of distributed data processing node 603. To support heterogeneous resources across the distributed data processing nodes, each distributed data processing node 601-603 may indicated, during initial installation in the network monitoring system 103 and establishment of connection(s) to the registration server(s) 605, which processing functions are supported by the respective distributed data processing node. Thereafter, if a registration/record access request specifies by a request attribute that a particular processing function is requested, the functional request and associated data may be forwarded to a distributed data processing node with suitable processing capabilities in a manner similar to routing requests based on available resources.

Strong Consistency Guarantee

Weak database consistency allowing different distributed data processing nodes to each modify locally cached copies of a record, aggregating the various changes to different record copies over time and allowing potential conflicts between locally cached versions of a record, may be sufficient for some applications. Other applications require strong consistency to avoid data conflicts. Various options may be considered for ensuring strong consistency: Every record access may be limited to only one true source of data, but even with distributed data imbalances in requests between different distributed data processing nodes may result. In addition, this may require that one central system (e.g., the registration server) know where every record is located, requiring distributed data processing nodes to obtain the record location from that central system and then request the data from the location identified, increasing loading on communications links. In the present disclosure, a first access to a record may require the requesting distributed data processing node 601 to contact the registration server(s) 605 for an ownership indication. All subsequent accesses of the same record by distributed data processing node 601 may be requested directly from the owner node, without requesting an ownership indication. Owner identifiers 723y-723z in storage 711 enable such direct second and subsequent record access requests. A risk arises of a request fail as illustrated in FIG. 9 (step 908) due to ownership transfer for the record and a requesting distributed data processing node attempting to access the record at the prior owner. Record ownership transfers are publicized to the registration server(s) 605, such that a current ownership indication may be requested following a registration request fail, as illustrated in FIG. 9. To avoid the need for such ownership indication requests following a registration request fail, a distributed data processing node 601 transferring ownership of a particular record 713c need not flush the record from storage 711. Instead, the record may be transferred to the portion of storage 711 maintaining duplicate copies of records (e.g., records 717y-717z) and marked with an ownership transfer attribute as well as the ownership identifier to the new owner. The former owner then responds to subsequent registration requests for that record from another distributed data processing node with the owner identifier for the new owner of the request, and also forwards the registration request to the new owner of the record. Less communication resources will generally be required over a failover to requesting an ownership indication from the registration server(s) 605.

Figure 11:
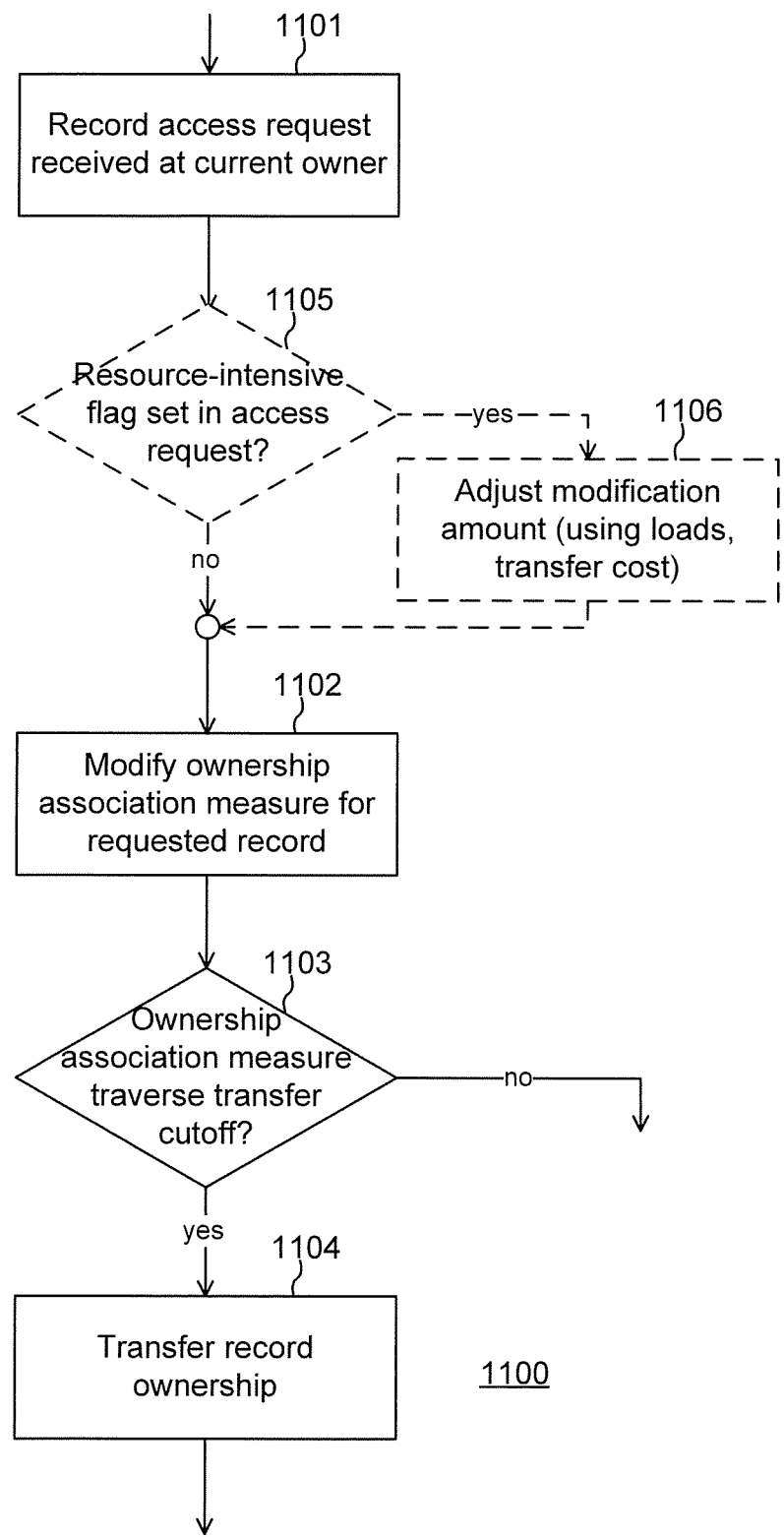
FIG. 11 is a flowchart illustrating a portion of operation of the network monitoring system of FIGS. 1 and 2 during distributed processing of distributed data in a distributed data processing system according to embodiments of the present disclosure.

FIG. 11 is a flowchart illustrating a portion of the operation of the network monitoring system of FIGS. 1 and 2 during distributed processing of distributed data in a distributed data processing system according to embodiments of the present disclosure. The process 1100 may be performed by a processor or processing element within any one of the distributed data processing nodes 601-603, such as processor 710 in a first distributed data processing node 601. The first distributed data processing node 601 is part of a distributed network of the distributed data processing nodes 601-603 in network monitoring system 103. The first distributed data processing node 601 receives, at a data processing or ownership association control 712 for the first distributed data processing node 601, a read or update access of first data (e.g., record 714a) having an association with the first distributed data processing node 601 (step 1101). In this example, the association is ownership of the record 714a by the first distributed data processing node 601, and is employed to determine which of the distributed data processing nodes 601-603 will process or update the first data, record 714a. Based on the ownership of record 614a, the first distributed data processing node 601 will process or update record 714a.

Using the ownership association control 712 and in response to receiving the access of record 714a, the first distributed data processing node 601 modifies an ownership association value 715a for the association of the record 713a with the first distributed data processing node 601 (step 1102). The modification to ownership association value 715a is based on whether the access originated from the first distributed data processing node 601 or a second distributed data processing node 602. The modification to the ownership association value 715a is derived from, and causes the ownership association value 715a to be derived from, at least the access history data 716a of either read or update accesses to the record 713a by at least the first distributed data processing node 601 and by the second distributed data processing node 602.

Using the ownership association control 712, the first distributed data processing node 601 determines whether the modified ownership association value 715a has traversed a selected cutoff (e.g., fallen below 1) for changing the association of the record 714a from the first distributed data processing node 601 to the second distributed data processing node 602 (step 1103). When the modified ownership association value 715a traverses the selected cutoff, the ownership association control 712 changes the association of the record 714a from the first distributed data processing node 601 to the second distributed data processing node 602 by transferring ownership of the record 714a to the second distributed data processing node 602 (step 1104). Changing the association of the record 714a from the first distributed data processing node 601 to the second distributed data processing node 602 contributes to adaptively localizing processing of the record 714a where information necessitating access to the 714a is received by the distributed network.

Prior to modifying the ownership association value 715a of record 714a, the ownership association control 712 may optionally determine whether a flag associated with the access of the record 714a is set to indicate a resource-intensive access (step 1105). When the resource-intensive flag is set, the ownership association control 712 optionally accounts for current processing loads of the first and second distributed data processing nodes 601, 602 when modifying the ownership association value 715a of record 714a with the first distributed data processing node 601 based upon the access by, for example, adjusting the modification amount (step 1106). The modification amount may be set based on both the current processing loads of the first and second distributed data processing nodes 601, 602 and a data transport overhead associated with moving the record 714a from the first distributed data processing node 601 to the second distributed data processing node 602. In modifying the ownership association value 715a of record 714a, the modification may involve incrementing the ownership association value 715a for accesses to the record 714a by the first distributed data processing node 601 and decrementing the ownership association value 715a for accesses to the record 714a by the second distributed data processing node 602.

Figure 12:
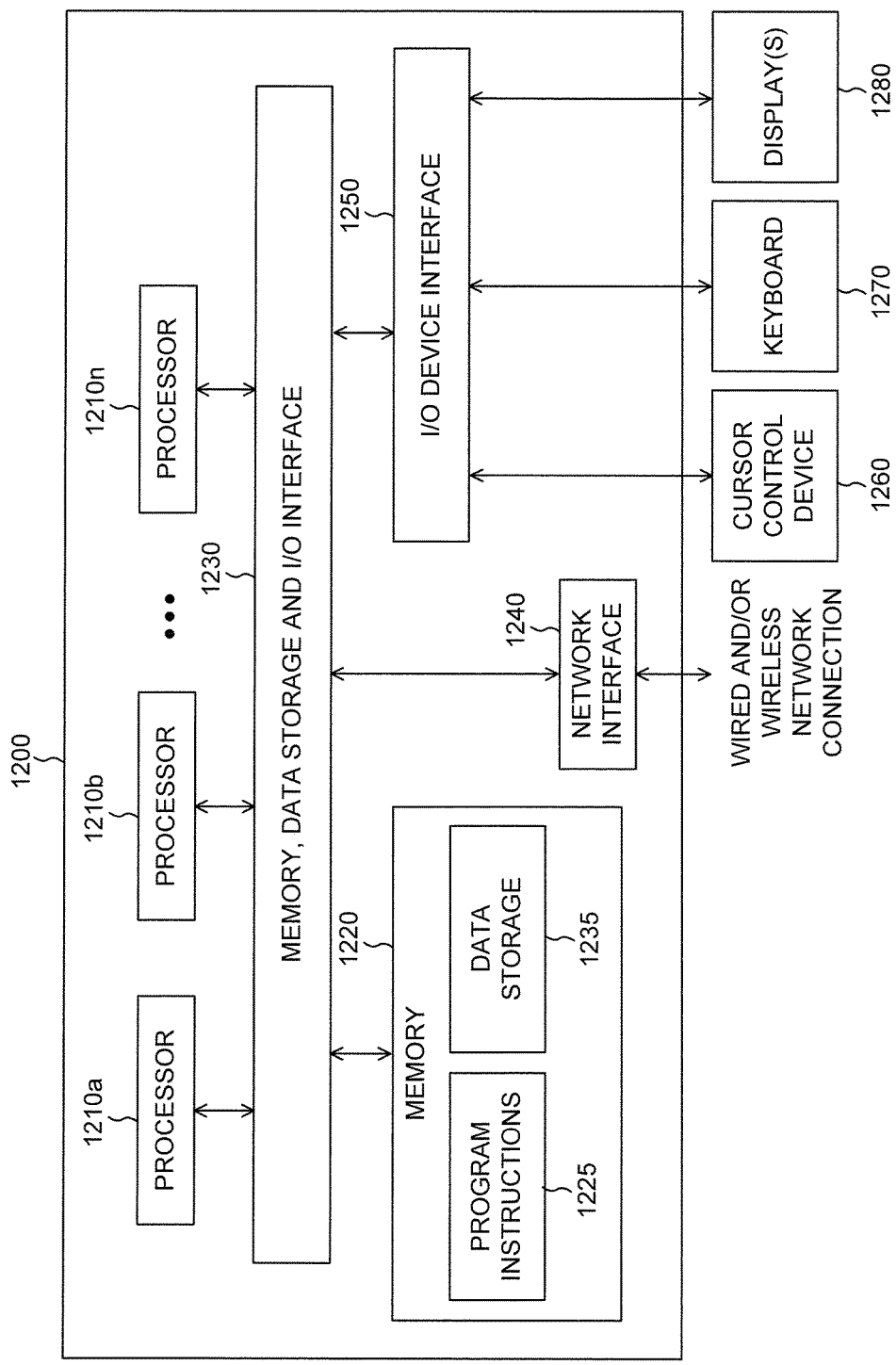
FIG. 12 is a block diagram of an exemplary data processing system that may be configured to implement the systems and methods, or portions of the systems and methods, described in the preceding figures.

Aspects of network monitoring system 103 and other systems depicted in the preceding figures may be implemented or executed by one or more computer systems. One such computer system is illustrated in FIG. 12. In various embodiments, computer system 1200 may be a server, a mainframe computer system, a workstation, a network computer, a desktop computer, a laptop, or the like. For example, any of nodes 101a-101d and endpoints 102a-102b, as well as monitoring system and interface station 105, may be implemented with computer system 1200 or some variant thereof. In some cases, the monitoring probe implemented by front-end devices 205a-205b shown in FIG. 2 may be implemented as computer system 1200. Moreover, one or more of analyzer devices 210a-210b and/or intelligence engine 215 in FIG. 2, eNB 402, MME 403, HSS 404, ODG 405, SGW 406 and/or PGW 407 in FIG. 4, and client 502, server 503, and/or MPs 510a-510n in FIG. 5, may include one or more computers in the form of computer system 1200 or a similar arrangement, with modifications such as including a transceiver and antenna for eNB 502 or omitting external input/output (I/O) devices for MP blades 510a-510n. As explained above, in different embodiments these various computer systems may be configured to communicate with each other in any suitable way, such as, for example, via network 100. Each computer system depicted and described as a single, individual system in the simplified figures and description of this disclosure can each be implemented using one or more data processing systems, which may be but are not necessarily commonly located. For example, as known to those of skill in the art, different functions of a server system may be more efficiently performed using separate, interconnected data processing systems, each performing specific tasks but connected to communicate with each other in such a way as to together, as a whole, perform the functions described herein for the respective server system. Similarly, one or more of multiple computer or server systems depicted and described herein could be implemented as an integrated system as opposed to distinct and separate systems.

As illustrated, computer system 1200 includes one or more processors 1210a-1210n coupled to a system memory 1220 via a memory/data storage and I/O interface 1230. Computer system 1200 further includes a network interface 1240 coupled to memory/data storage and interface 1230, and in some implementations also includes an I/O device interface 1250 (e.g., providing physical connections) for one or more input/output devices, such as cursor control device 1260, keyboard 1270, and display(s) 1280. In some embodiments, a given entity (e.g., network monitoring system 103) may be implemented using a single instance of computer system 1200, while in other embodiments the entity is implemented using multiple such systems, or multiple nodes making up computer system 1200, where each computer system 1200 may be configured to host different portions or instances of the multi-system embodiments. For example, in an embodiment some elements may be implemented via one or more nodes of computer system 1200 that are distinct from those nodes implementing other elements (e.g., a first computer system may implement classification engine 310 while another computer system may implement routing/distribution control module 330).

In various embodiments, computer system 1200 may be a single-processor system including only one processor 1210a, or a multi-processor system including two or more processors 1210a-1200n (e.g., two, four, eight, or another suitable number). Processor(s) 1210a-1210n may be any processor(s) capable of executing program instructions. For example, in various embodiments, processor(s) 1210a-1210n may each be a general-purpose or embedded processor(s) implementing any of a variety of instruction set architectures (ISAs), such as the x86, POWERPC, ARM, SPARC, or MIPS ISAs, or any other suitable ISA. In multi-processor systems, each of processor(s) 1210a-1210n may commonly, but not necessarily, implement the same ISA. Also, in some embodiments, at least one processor(s) 1210a-1210n may be a graphics processing unit (GPU) or other dedicated graphics-rendering device.

System memory 1220 may be configured to store program instructions 1225 and/or data (within data storage 1235) accessible by processor(s) 1210a-1210n. In various embodiments, system memory 1220 may be implemented using any suitable memory technology, such as static random access memory (SRAM), synchronous dynamic RAM (SDRAM), nonvolatile/Flash-type memory, solid state disk (SSD) memory, hard drives, optical storage, or any other type of memory, including combinations of different types of memory. As illustrated, program instructions and data implementing certain operations, such as, for example, those described herein, may be stored within system memory 1220 as program instructions 1225 and data storage 1235, respectively. In other embodiments, program instructions and/or data may be received, sent or stored upon different types of computer-accessible media or on similar media separate from system memory 1220 or computer system 1200. Generally speaking, a computer-accessible medium may include any tangible, non-transitory storage media or memory media such as magnetic or optical media—e.g., disk or compact disk (CD)/digital versatile disk (DVD)/DVD-ROM coupled to computer system 1200 via interface 1230.

In an embodiment, interface 1230 may be configured to coordinate I/O traffic between processor 1210, system memory 1220, and any peripheral devices in the device, including network interface 1240 or other peripheral interfaces, such as input/output devices 1250. In some embodiments, interface 1230 may perform any necessary protocol, timing or other data transformations to convert data signals from one component (e.g., system memory 1220) into a format suitable for use by another component (e.g., processor(s) 1210a-1210n). In some embodiments, interface 1230 may include support for devices attached through various types of peripheral buses, such as a variant of the Peripheral Component Interconnect (PCI) bus standard or the Universal Serial Bus (USB) standard, for example. In some embodiments, the function of interface 1230 may be split into two or more separate components, such as a north bridge and a south bridge, for example. In addition, in some embodiments some or all of the functionality of interface 1230, such as an interface to system memory 1220, may be incorporated directly into processor(s) 1210a-1210n.

Network interface 1240 may be configured to allow data to be exchanged between computer system 1200 and other devices attached to network 100, such as other computer systems, or between nodes of computer system 1200. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fiber Channel storage area networks (SANs); or via any other suitable type of network and/or protocol.

Input/output devices 1250 may, in some embodiments, include one or more display terminals, keyboards, keypads, touch screens, scanning devices, voice or optical recognition devices, or any other devices suitable for entering or retrieving data by one or more computer system 1200. Multiple input/output devices 1260, 1270, 1280 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1225, configured to implement certain embodiments or the processes described herein, and data storage 1235, comprising various data accessible by program instructions 1225. In an embodiment, program instructions 1225 may include software elements of embodiments illustrated by FIG. 2. For example, program instructions 1225 may be implemented in various embodiments using any desired programming language, scripting language, or combination of programming languages and/or scripting languages (e.g., C, C++, C#, JAVA, JAVASCRIPT, PERL, etc.). Data storage 1235 may include data that may be used in these embodiments. In other embodiments, other or different software elements and data may be included.

A person of ordinary skill in the art will appreciate that computer system 1200 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations in which elements of different embodiments described herein can be combined, elements can be omitted, and steps can performed in a different order, sequentially, or concurrently.

The various techniques described herein may be implemented in hardware or a combination of hardware and software/firmware. The order in which each operation of a given method is performed may be changed, and various elements of the systems illustrated herein may be added, reordered, combined, omitted, modified, etc. It will be understood that various operations discussed herein may be executed simultaneously and/or sequentially. It will be further understood that each operation may be performed in any order and may be performed once or repetitiously. Various modifications and changes may be made as would be clear to a person of ordinary skill in the art having the benefit of this specification. It is intended that the subject matter(s) described herein embrace all such modifications and changes and, accordingly, the above description should be regarded in an illustrative rather than a restrictive sense. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a first processing node within a distributed network of processing nodes, the method comprising:

receiving, at a data processing control for the first processing node, an access of first data having an ownership association with the first processing node, wherein the ownership association is employed in determining which of the processing nodes will process the first data;

using the data processing control, modifying an ownership association value based on whether the access originated from the first processing node or a second processing node within the distributed network, wherein the ownership association value indicates a strength of the ownership association of the first data with the first processing node and is derived from at least a history of accesses of the first data by the first processing node and by the second processing node, wherein each of the accesses is one of an update of the first data and a read of the first data; and using the data processing control, determining whether the modified ownership association value has traversed a selected cutoff for changing the ownership association of the first data from the first processing node to the second processing node, and, when the modified ownership association value traverses the selected cutoff, changing the ownership association of the first data from the first processing node to the second processing node, using the data processing control, determining whether a flag associated with the access of the first data is set to indicate a resource-intensive access, and, when the flag is set, accounting for current processing loads of the first and second processing nodes when modifying the ownership association value of the first data based upon the access, wherein changing the ownership association of the first data from the first processing node to the second processing node contributes to adaptively localizing processing of the first data where information necessitating access to the first data is received by the distributed network.

2. The method according to claim 1, further comprising:
using the data processing control, determining whether to set the flag associated with the access of the first data to indicate a resource-intensive access.

3. The method according to claim 1, further comprising:
using the data processing control, employing both the current processing loads of the first and second processing nodes and a data transport overhead associated with moving the first data from the first processing node to the second processing node when modifying the ownership association value of the first data based on the access.

4. The method according to claim 1, further comprising:
using the data processing control, incrementing the ownership association value in response to accesses to the first data by the first processing node and decrementing the ownership association value in response to accesses to the first data by the second processing node.

5. The method according to claim 1, wherein the selected cutoff for the ownership association value is selected to avoid migration of processing of the first data between the first and second processing nodes that results in an increase in data transport overhead over leaving the ownership association of the first data with the first processing node unchanged.

6. The method according to claim 1, wherein the selected cutoff is traversed when a mobile device associated with the first data changes an area of operation for at least a predefined period from a first geographic region served by the first processing node to a second geographic region served by the second processing node.

7. The method according to claim 1, further comprising:
using the data processing control, requesting an indication of ownership association of selected data from an ownership association registration server, wherein the request for the indication of ownership association of the selected data includes a callback and data to be passed to the callback with the selected data to allow either of the first and second processing nodes to update the selected data; and
receiving, at the data processing control from the ownership association registration server, one of
an identification of a processing node within the distributed network with which the selected data is associated, and
when no ownership association of the selected data with any of the processing nodes within the distributed network is registered with the ownership association registration server, an assignment of ownership association of the selected data with the first processing node.

8. The first processing node according to claim 1, wherein the at least one processor is configured to
request an indication of ownership association of selected data from an ownership association registration server, wherein the request for the indication of ownership association of the selected data includes a callback and data to be passed to the callback with the selected data in order to allow either of the first and second processing nodes to update the selected data, and
receive, from the ownership association registration server, one of
an identification of a processing node within the distributed network with which the selected data is associated, and
when no ownership association of the selected data with any of the processing nodes within the distributed network is registered with the ownership association registration server, an assignment of ownership association of the selected data with the first processing node.

9. A first processing node configured to operate within a distributed network of processing nodes, the first processing node comprising:
at least one hardware-implemented processor communicably coupled to a memory, the at least one hardware-implemented processor configured to:
receive an access of first data having an ownership association with the first processing node, wherein the ownership association is employed in determining which of the processing nodes will process the first data, and
modify an ownership association value based on whether the access originated from the first processing node or a second processing node within the distributed network, wherein the ownership association value indicates a strength of the ownership association of the first data with the first processing node and is derived from at least a history of accesses of the first data by the first processing node and by the second processing node, wherein each of the accesses is one of an update of the first data and a read of the first data,
determine whether the modified ownership association value has traversed a selected cutoff for changing the ownership association of the first data from the first processing node to the second processing node, and, when the modified ownership association value traverses the selected cutoff, changing the ownership association of the first data from the first processing node to the second processing node, and
determine whether a flag associated with the access of the first data is set to indicate a resource-intensive access, and, when the flag is set, account for current processing loads of the first and second processing nodes when modifying the ownership association value of the first data based upon the access,
wherein changing the ownership association of the first data from the first processing node to the second processing node contributes to adaptively localizing processing of the first data where information necessitating access to the first data is received by the distributed network.

10. The first processing node according to claim 9, wherein the at least one processor is configured to determine whether to set the flag associated with the access of the first data to indicate a resource-intensive access.

11. The first processing node according to claim 9, wherein the at least one processor is configured to employ both the current processing loads of the first and second processing nodes and a data transport overhead associated with moving the first data from the first processing node to the second processing node when modifying the ownership association value of the first data based on the access.

12. The first processing node according to claim 9, wherein the at least one processor is configured to increment the ownership association value in response to accesses to the first data by the first processing node and decrement the ownership association value in response to accesses to the first data record by the second node.

13. The first processing node according to claim 9, wherein the selected cutoff for the ownership association value is selected to avoid migration of processing of the first data between the first and second processing nodes that results in an increase in data transport overhead over leaving the ownership association of the first data with the first processing node unchanged.

14. The first processing node according to claim 9, wherein the selected cutoff is traversed when a mobile device associated with the first data changes an area of operation for at least a predefined period from a first geographic region served by the first processing node to a second geographic region served by the second processing node.

15. A system, comprising: a distributed network of processing nodes including at least:
a first processing node including a first hardware-implemented processor and a first memory,
a second processing node including a second hardware-implemented processor and a second memory, wherein the first hardware-implemented processor is configured to:
receive a first access of first data having an ownership association with the first processing node, wherein the access is one of an update of the first data and a read of the first data and wherein the ownership association controls which of the first and second processing nodes processes the first data,
modify an ownership association value for the first data based on whether the first access originated from the first processing node or the second processing node, and, when the modified ownership association value traverses a selected cutoff, change the ownership association of the first data from the first processing node to the second processing node to contribute to adaptively localizing processing of the first data where information necessitating access to the first data is received by the distributed network, wherein the ownership association value indicates a strength of the ownership association of the first data with the first processing node and is derived from at least a history of accesses of the first data by the first and second processing nodes, and
determine whether a flag associated with the access of the first data is set to indicate a resource-intensive access, and, when the flag is set, account for current processing loads of the first and second processing nodes when modifying the ownership association value of the first data based upon the access, and wherein at least one of the first and second memories is configured to store an indication of ownership association of the first data with the first processing node and an indication of ownership association of second data,
wherein the second hardware-implemented processor is configured to receive a second access of the second data, request an indication of the ownership association of the second data from the ownership association registration server, and, in response to receiving an indication of ownership association for the second data indicating that ownership of the second data is associated with the first processing node, communicate information regarding the second access to the first processing node for processing of the second access by the first processing node.

16. The system according to claim 15, wherein the first processor is configured to determine whether to set the flag associated with the access of the first data to indicate a resource-intensive access.

17. The system according to claim 15, wherein the first data processing control is configured to employ both the current processing loads of the first and second processing nodes and a data transport overhead associated with moving the first data from the first processing node to the second processing node when modifying the ownership association value of the first data based on the access.

18. The system according to claim 15, wherein the first data processing control is configured to increment the ownership association value in response to accesses to the first data by the first processing node and decrement the ownership association value in response to accesses to the first data record by the second node.

19. The system according to claim 15, wherein the system is configured to employ computational capabilities of both the first and second processing nodes when assigning an initial ownership association of the first data.

20. The system according to claim 15, wherein the first data processing node is configured, in response to receiving a second access of the first data from the second data processing node following transfer of the ownership association of the first data to a third data processing node, to respond to the second access with an indication of a current ownership association of the first data to the second data processing node and forward the second access to the third data processing node.

* * * * *